United States Patent
Sasaki

[19]

[11] Patent Number: 6,103,385
[45] Date of Patent: Aug. 15, 2000

[54] CERAMIC ELECTRONIC PART, AND METHOD FOR THE PRODUCTION THEREOF

[75] Inventor: Nobuhiro Sasaki, Tokyo, Japan

[73] Assignee: Taiyo Yuden Co., Ltd., Tokyo, Japan

[21] Appl. No.: 09/064,833

[22] Filed: Apr. 23, 1998

[30] Foreign Application Priority Data

Apr. 30, 1997 [JP] Japan ................................. 9-126266

[51] Int. Cl.$^7$ ............................. B32B 9/00; C04B 35/46
[52] U.S. Cl. ..................... 428/469; 428/141; 428/209; 428/364; 428/697; 428/701; 428/702; 428/472; 333/219.1; 501/138; 501/139
[58] Field of Search ................................. 428/141, 209, 428/364, 697, 701, 702, 469, 472; 333/219.1; 501/138, 139; C04B 35/46

[56] References Cited

U.S. PATENT DOCUMENTS

| | | | |
|---|---|---|---|
| 4,959,255 | 9/1990 | Suzuki ..................................... | 428/143 |
| 5,077,247 | 12/1991 | Sato et al. ............................... | 501/137 |
| 5,185,304 | 2/1993 | Hirai et al. .............................. | 501/139 |
| 5,244,851 | 9/1993 | Takahashi et al. ....................... | 501/139 |
| 5,256,639 | 10/1993 | Fujimaru et al. ........................ | 501/137 |
| 5,292,694 | 3/1994 | Abe et al. ................................ | 501/139 |
| 5,328,761 | 7/1994 | Omori et al. ............................ | 428/336 |
| 5,350,721 | 9/1994 | Abe et al. ................................ | 501/139 |
| 5,391,422 | 2/1995 | Omori et al. ............................ | 428/212 |
| 5,479,140 | 12/1995 | Abe et al. ................................ | 333/202 |
| 5,827,792 | 10/1998 | Fukuda et al. .......................... | 501/138 |

FOREIGN PATENT DOCUMENTS

| | | | |
|---|---|---|---|
| 0036227 | 10/1971 | Japan ..................................... | 501/139 |
| 0134902 | 4/1979 | Japan ..................................... | 501/139 |
| 404274109 | 9/1992 | Japan ..................................... | 501/139 |

*Primary Examiner*—Deborah Jones
*Assistant Examiner*—Jason Resnick
*Attorney, Agent, or Firm*—Snider & Associates; Ronald R. Snider

[57] ABSTRACT

The ceramic electronic part has a ceramic material and an electrode formed on the surface of the ceramic material. The ceramic material has rod-shaped particles formed projecting from the surface thereof, the rod-shaped particles having an aspect ratio (a long axis/short axis ratio) of from 3 to 30. The ceramic material is formed using a dielectric ceramic composition containing, as a major component, a composite oxide which, for example, comprises an oxide of barium (Ba), an oxide of titanium (Ti) an oxide of at least one rare earth element and one or both of an oxide of bismuth (Bi) and an oxide of lead (Pb). The ceramic electronic part can improve its characteristics at high frequency inherent in conventional ones which suffer from the remarkably worsening of their high frequency characteristics due to a rise in the specific resistance of the electrode when it attempts to improve the adherence strength of the electrode are made using an electrode paste to which a component capable of causing a chemical reaction with the ceramic material or which worsen their high frequency characteristics by the remaining of materials obtained by the reaction with a treatment liquid on the surface of the ceramic material when attempts are made to improve the adherence strength between the ceramic material and the electrode by chemical treatment.

3 Claims, 2 Drawing Sheets

F I G. 3
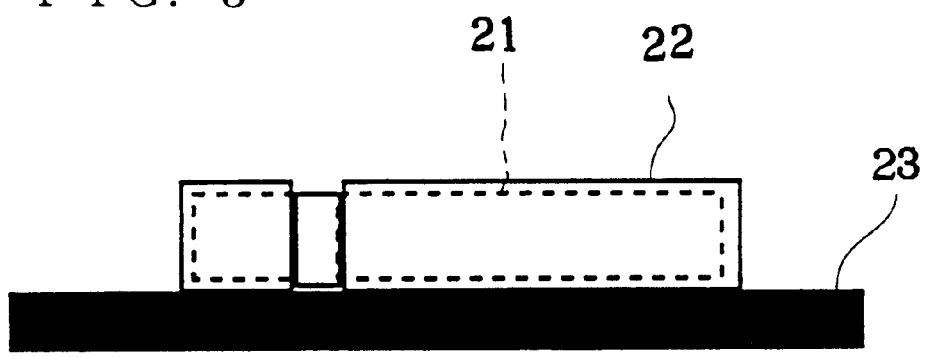

CERAMIC ELECTRONIC PART, AND METHOD FOR THE PRODUCTION THEREOF

BACKGROUND OF THE INVENTION

1. Field of the Invention

The present invention relates to a ceramic electronic part for high frequency with improved adherence strength between a ceramic material and an electrode, each constituting the ceramic electronic part and to a method for the preparation of the same.

2. Description of the Related Art

As a raw material for a ceramic material of a ceramic electronic part for high frequency, there have been proposed dielectric ceramic compositions containing a composite oxide of barium (Ba), titanium (Ti) and a rare earth elements (Ln) with bismuth (Bi) and/or lead (Pb) as a major component. Ceramic materials consisting of such dielectric ceramic compositions, however, are insufficient in an adherence strength with an electrode so that demands to improve such adherence strength have been made.

In order to improve an adherence strength between a ceramic material and an electrode, attempts have been proposed, for example, to use an electrode paste in which a small amount of a component capable of causing a chemical reaction with the ceramic material is added or to form an anchor point on the surface of a ceramic material by a chemical treatment using hydrofluoric acid or the like.

When the electrode paste containing such a minute amount of the component capable of inducing a chemical reaction is used to improve the adherence strength between the ceramic material and the electrode, however, the electrode paste suffers from the problem that the such minute component added thereto may raise a specific resistance to the electrode leading to a remarkable reduction in high frequency features of ceramic electronic parts resulting therefrom.

On the other hand, when the attempt to improve the adherence strength between the ceramic material and the electrode has been made by forming the anchor point on the surface of the ceramic material by a chemical treatment, the problems may arise that substances resulting from the reaction with a treatment liquid may be left untreated on the surface thereof, thereby failing to achieve a sufficient adherence strength and worsening high frequency characteristics of resulting ceramic electronic parts to a considerable extent. Moreover, this procedure causes the problem that it requires the use of a dangerous chemical substance such as hydrofluoric acid or the like as a treatment liquid and it may give rise to a hazard to working.

SUMMARY OF THE INVENTION

Therefore, the present invention has the object to provide a ceramic electronic part that can solve some problems inherent in the conventional ceramic electronic parts and that can achieve improved adherence strength between a ceramic material and an electrode.

In order to achieve the object, the present invention provides a ceramic electronic part comprising a ceramic material and an electrode formed on a surface of the ceramic material and having rod-shaped particles formed projecting from the ceramic material on the side of the electrode, the rod-shaped particles having an aspect ratio (a long axis/short axis ratio) of from 3 to 30.

Other objects, features and advantages of the present invention may become apparent in the course of the description that follows, with reference to the accompanying drawings.

BRIEF DESCRIPTION OF THE DRAWING

FIG. 3 is a schematic representation showing a TEM mode coaxial resonator and a sample for use in measurement for an adherence strength of an electrode for use in the embodiment of the present invention.

DESCRIPTION OF THE PREFERRED EMBODIMENTS

Figure 1:
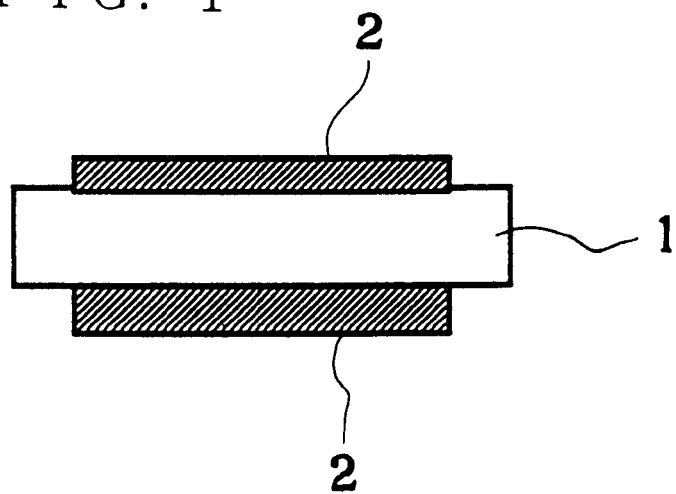
FIG. 1 is a schematic representation showing a ceramic condenser in accordance with an embodiment of the present invention.

The ceramic electronic part according to the present invention comprises a ceramic material and an electrode formed on a surface of the ceramic material, which has rod-shaped particles formed projecting from the ceramic material on the side of the electrode, the rod-shaped particles having an aspect ratio (a long axis/short axis ratio) of from 3 to 30.

It is to be understood herein that the ceramic material referred to herein may comprise a dielectric ceramic composition containing containing, as a major component, a composite oxide which, for example, comprises, an oxide of barium (Ba); an oxide of titanium (Ti); an oxide of at least one rare earth element; and one or both of an oxide of bismuth (Bi) and an oxide of lead (Pb). The rod-shaped particles are preferably formed projecting in a random manner from the surface of the ceramic material. The ceramic material may contain as a secondary component a compound containing one or more of elements selected from yttrium (Yi), aluminum (Al) and silicon (Si).

For the composite oxide, barium (Ba) may be used at a rate of from 16 to 16.5 mol %, when translated into BaO; titanium (Ti) at a rate of from 65.7 to 66.9 mol %, when translated into $TiO_2$; the rare earth element at a rate of from 14.4 to 16 mol %, when translated into an oxide of the rare earth element; and one or both of bismuth (Bi) at a rate of from 2 to 2.5 mol %, when translated into $Bi_2O_3$; and lead (Pb) at a rate of from 2 to 2.5 mol %, when translated into $Pb_3O_4$.

The ceramic electronic part according to the present invention may be prepared, for example, by the step of calcinating powdery raw materials comprising a mixture obtained by mixing barium (Ba), titanium (Ti) and the rare earth elements (Ln) with bismuth (Bi) and/or lead (Pb) with bismuth (Bi) and/or lead (Pb) at 1,0500° C. to 1,2000° C. for 1 to 4 hours, the step of forming the calcinated material into an appropriate shape, the step of calcining the appropriately shaped material at 1,220° C. to 1,320° C. for 1 to 5 hours, and the step of forming the calcined material with an electrode.

The powdery raw materials to be used for the present invention may comprise barium (Ba) at the rate of from 16 to 16.5 mol %, when translated into BaO; titanium (ti) at the rate of from 65.7 to 66.9 mol %, when translated into $TiO_2$; the rare earth element at the rate of from 14.4 to 16 mol %, when translated into the oxide of the rare earth element; and one or both of bismuth (Bi) at the rate of from 2 to 2.5 mol %, when translated into $Bi_2O_3$; and lead (Pb) at the rate of from 2 to 2.5 mol %, when translated into $Pb_3O_4$. Further, a carbonate, a hydroxide or an oxalate of the compounds may also be used in addition to the oxide thereof.

The present invention will be described in more detail by way of examples.

EXAMPLES

Powders of each of the following compounds, i.e. BaO, $TiO_2$, $Nd_2O_3$, $CeO_2$, $La_2O_3$, $Pr_6O_{11}$, $Sm_2O_3$, $Gd_2O_3$, $Bi_2O_3$, $Pb_3O_4$, $Y_2O_3$, $Al_2O_3$, and $SiO_2$ are weighed in the amount as Samples No. 1 to 40, inclusive, in Tables 1-1 and 1-2. The weighed amount of each of the compounds was placed in a polyethylene pot together with water and the mixture was admixed well in a wet state, followed by removing water from the mixture and then drying at 150° C.

The dry mixture was then calcinated in air at 1,020° C. to 1,250° C. for 0.5 to 5 hours and the calcinated mixture was placed in a polyethylene pot together with water. The mixture was then pulverized in a wet state and the finely divided mixture was dewatered, followed by drying the resulting mixture at 150° C. and yielding the raw material for a dielectric ceramic material.

To the resulting raw material was added an organic binder and the resulting mixture was granulated and molded under pressure at 500 kg/cm² into a molded disk having a diameter of 9.8 mm and a thickness of 0.6 mm. The resulting disk was placed on a zirconia setter and calcined in air at 1,200° C. to 1,350° C. for 0.5 to 6 hours, resulting to the formation of a ceramic material.

The resulting ceramic material was then measured for an aspect ratio (a long axis/short axis ratio) of rod-shaped crystal on the surface thereof and a roughness degree on the surface thereof.

TABLE 1-1

| SAMPLE NOS. | MOL E RATIO OF MAIN COMPONENTS | | | | | | | | | | WEIGHT % PER MAIN COMPONENT | | |
|---|---|---|---|---|---|---|---|---|---|---|---|---|---|
| | BaO | $TiO_2$ | $Nd_2O_3$ | $CeO_2$ | $La_2O_3$ | $Pr_6O_{11}$ | $Sm_2O_3$ | $Gd_2O_3$ | $Bi_2O_3$ | $Pb_3O_4$ | $Y_2O_3$ | $Al_2O_3$ | $SiO_2$ |
| 1 | 16.10 | 66.20 | 15.30 | — | — | — | — | — | 2.40 | — | 0.3 | 0.2 | 0.6 |
| 2 | 16.40 | 66.50 | 15.00 | — | — | — | — | — | 2.10 | — | 0.3 | 0.2 | 0.6 |
| 3 | 16.10 | 66.20 | 15.50 | — | — | — | — | — | 2.20 | — | 0.2 | 0.2 | 0.4 |
| 4 | 16.50 | 66.60 | 14.90 | — | — | — | — | — | 2.00 | — | 0.1 | 0.1 | 0.6 |
| 5 | 16.30 | 66.50 | 15.00 | — | — | — | — | — | 1.10 | 1.10 | 0.2 | 0.1 | 0.5 |
| 6 | 16.50 | 66.30 | 15.10 | — | — | — | — | — | 2.10 | — | 0.3 | 0.1 | 0.4 |
| 7 | 16.20 | 65.70 | 16.00 | — | — | — | — | — | 2.10 | — | 0.2 | 0.1 | 0.4 |
| 8 | 16.40 | 66.60 | 14.90 | — | — | — | — | — | 2.10 | — | 0.2 | — | 0.4 |
| 9 | 16.20 | 65.80 | 15.80 | — | — | — | — | — | — | 2.20 | 0.2 | 0.2 | 0.5 |
| 10* | 16.10 | 66.90 | 14.70 | — | — | — | — | — | 2.30 | — | 0.2 | 0.3 | 0.5 |
| 11 | 16.30 | 66.20 | 15.10 | — | — | — | — | — | 2.40 | — | 0.2 | — | 0.4 |
| 12 | 16.10 | 66.60 | 15.00 | — | — | — | — | — | 2.30 | — | 0.1 | 0.2 | 0.4 |
| 13* | 16.10 | 66.20 | 15.40 | — | — | — | — | — | 2.00 | 0.30 | — | — | 0.6 |
| 14 | 16.00 | 66.60 | 15.00 | — | — | — | — | — | 0.20 | 2.20 | 0.1 | 0.1 | 0.5 |
| 15 | 16.30 | 66.90 | 14.40 | — | — | — | — | — | 2.40 | — | 0.1 | 0.1 | 0.6 |
| 16* | 16.10 | 66.10 | 15.30 | — | — | — | — | — | — | 2.50 | — | 0.1 | 0.5 |
| 17* | 16.10 | 66.30 | 15.30 | — | — | — | — | — | — | 2.30 | — | 0.2 | 0.5 |
| 18 | 16.10 | 66.50 | — | — | — | — | 15.30 | — | 2.10 | — | — | 0.2 | 0.5 |
| 19 | 16.10 | 66.10 | 15.60 | — | — | — | — | — | 2.20 | — | — | 0.2 | 0.4 |
| 20* | 16.00 | 66.10 | 15.70 | — | — | — | — | — | 2.20 | — | — | 0.1 | 0.6 |

*SAMPLE FOR COMPARATIVE EXAMPLE

TABLE 1-2

| SAMPLE NOS. | MOL E RATIO OF MAIN COMPONENTS | | | | | | | | | | WEIGHT % PER MAIN COMPONENT | | |
|---|---|---|---|---|---|---|---|---|---|---|---|---|---|
| | BaO | $TiO_2$ | $Nd_2O_3$ | $CeO_2$ | $La_2O_3$ | $Pr_6O_{11}$ | $Sm_2O_3$ | $Gd_2O_3$ | $Bi_2O_3$ | $Pb_3O_4$ | $Y_2O_3$ | $Al_2O_3$ | $SiO_2$ |
| 21 | 16.40 | 65.90 | — | — | 15.60 | — | — | — | 2.10 | — | 0.2 | 0.2 | 0.4 |
| 22 | 16.00 | 66.20 | 15.50 | — | — | — | — | — | 2.30 | — | 0.3 | 0.3 | 0.6 |
| 23 | 16.10 | 65.80 | 15.70 | — | — | — | — | — | 2.40 | — | 0.2 | — | 0.5 |
| 24 | 16.30 | 66.00 | 15.20 | — | — | — | — | — | 2.50 | — | 0.3 | — | 0.5 |
| 25 | 16.50 | 66.30 | 14.90 | — | — | — | — | — | 2.30 | — | — | 0.2 | 0.5 |
| 26 | 16.30 | 65.80 | 10.80 | — | — | — | 1.70 | 3.30 | 2.10 | — | 0.2 | 0.1 | 0.5 |
| 27 | 16.00 | 66.10 | 15.80 | — | — | — | — | — | 2.10 | — | — | 0.1 | 0.6 |
| 28 | 16.20 | 66.30 | 15.20 | — | — | — | — | — | 2.30 | — | 0.1 | 0.1 | 0.6 |
| 29 | 16.10 | 66.90 | 4.40 | 10.30 | — | — | — | — | 2.30 | — | 0.2 | 0.3 | 0.5 |
| 30 | 16.30 | 66.90 | 14.40 | — | — | — | — | — | 2.40 | — | 0.1 | 0.1 | 0.6 |
| 31 | 16.30 | 66.50 | — | — | — | 10.50 | 4.50 | — | 2.20 | — | 0.2 | 0.1 | 0.5 |
| 32 | 16.40 | 66.50 | 15.00 | — | — | — | — | — | 2.10 | — | 0.3 | 0.2 | 0.6 |
| 33* | 16.00 | 66.20 | 15.50 | — | — | — | — | — | 2.30 | — | 0.3 | 0.3 | 0.6 |
| 34* | 16.00 | 66.10 | 15.70 | — | — | — | — | — | 2.20 | — | — | — | 0.6 |
| 35 | 16.10 | 66.30 | 15.30 | — | — | — | — | — | 2.30 | — | — | 0.2 | 0.5 |
| 36 | 16.30 | 66.50 | 9.90 | — | — | 5.10 | — | — | 2.20 | — | 0.2 | 0.1 | 0.5 |
| 37 | 16.30 | 66.90 | 14.40 | — | — | — | — | — | 2.40 | — | 0.1 | 0.1 | 0.6 |
| 38* | 16.20 | 66.20 | 15.10 | — | — | — | — | — | 2.40 | — | 0.2 | — | 0.5 |
| 39 | 16.10 | 66.10 | 15.70 | — | — | — | — | — | 2.10 | — | — | 0.2 | 0.4 |
| 40* | 16.00 | 66.10 | 15.50 | — | — | — | — | — | 2.40 | — | — | 0.2 | 0.5 |

*SAMPLE FOR COMPARATIVE EXAMPLE

The aspect ratio of the rod-shaped crystal on the surface of the ceramic material was measured by mirror-polishing the surface of the ceramic material and calcining the surface thereof at the temperature in the range of from 1,000° C. to 1,150° C. in air to melt the particle boundary to a little extent. The surface of the ceramic material was then measured for its aspect ratio (the long axis/short axis ratio) with an electron microscope at a magnification of 2,000 times. The aspect ratio referred to herein is intended to mean an average value of all crystalline particles that were included at least partially within a unit circle of an observation image.

The resulting ceramic material was then coated at its both surfaces with a silver paste and baked. With the baked ceramic material, a ceramic condenser comprising the baked ceramic material 1 and two sheets of electrodes 2 and 2 was formed by interposing the baked ceramic material 1 with a pair of the electrodes 2 and 2 as shown in FIG. 1.

The resulting ceramic condenser was measured for its relative dielectric constant $\epsilon r$, Q factor, and temperature coefficient $\tau \epsilon r$ (ppm/° C) of the relative dielectric constant.

The relative dielectric constant $\epsilon r$ and the Q factor were measured under the conditions at frequency of 1 MHz, 1 V and ambient temperature of 20° C. The temperature coefficient $\tau \epsilon r$ (ppm/° C.) of the relative dielectric constant was referred to herein as a variation rate of the relative dielectric constant $\epsilon r$ at the temperature range of +20° C. to +85° C. relative to the relative dielectric constant $\epsilon r$ at the temperature of +20° C. and was measured at 1 MHz and 1 V.

Figure 2:
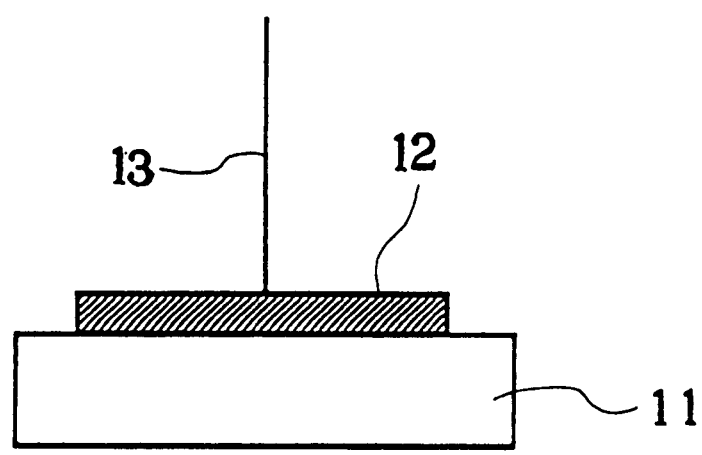
FIG. 2 is a schematic representation showing a sample for use in measurement for an adherence strength of an electrode for use in the embodiment of the present invention.

Separately, the resulting ceramic material was coated at its one surface with a silver paste and baked. With the baked ceramic material, a sample for testing an adherence strength was prepared, as shown in FIG. 2, by superimposing an electrode 12 on the baked ceramic material 11 and soldering the electrode 12 perpendicularly with a lead wire 13 having a diameter of 0.5 mm and a length of 30 mm. The sample was tested for its adherence strength between the ceramic material 11 and the electrode 12.

Tables 2-1 and 2-2 show the test results for each of the Samples Nos. 1 to 40 of Tables 1-1 and 1-2 above: the aspect ratio of the precipitated particles, surface roughness Ra ($\mu$m), tension strength (kg/cm$^2$), relative dielectric constant $\epsilon r$, the Q factor, and the temperature coefficient $\tau \epsilon r$ (ppm/° C.) of the relative dielectric constant.

TABLE 2-1

| SAMPLE NOS. | CALCINATING TEMP. (° C.) | CALCINATING TIME (hr) | CALCINING TEMP (° C.) | CALCINING TIME (hr) | ASPECT RATIO | SURFACE ROUGHNESS ($\mu$m) | TENSILE STRENGTH (kg/cm$^2$) | RELATIVE DIELECTRIC CONSTANT ($\epsilon r$) | Q | $\tau \epsilon r$ |
|---|---|---|---|---|---|---|---|---|---|---|
| 1 | 1,050 | 2 | 1,260 | 2 | 10.5 | 2.73 | 5.3 | 89.8 | 1,420 | −22 |
| 2 | 1,100 | 2 | 1,260 | 1.5 | 10.7 | 2.60 | 5.1 | 89.3 | 1,430 | −20 |
| 3 | 1,100 | 2 | 1,280 | 2 | 16.8 | 3.66 | 6.7 | 89.8 | 1,400 | −20 |
| 4 | 1,050 | 2.5 | 1,300 | 2 | 22.5 | 3.95 | 8.1 | 91.4 | 1,330 | −20 |
| 5 | 1,200 | 3 | 1,260 | 2 | 12.5 | 3.42 | 6.1 | 89.8 | 1,400 | −21 |
| 6 | 1,100 | 4 | 1,220 | 2 | 4.4 | 2.36 | 4.5 | 89.1 | 1,440 | −19 |
| 7 | 1,050 | 3 | 1,220 | 3 | 3.2 | 2.14 | 4.2 | 89.5 | 1,430 | −22 |
| 8 | 1,100 | 2 | 1,300 | 2 | 24.8 | 3.92 | 8.8 | 92.0 | 1,320 | −24 |
| 9 | 1,050 | 2 | 1,320 | 2 | 27.9 | 4.02 | 9.0 | 91.9 | 1,350 | −26 |
| 10* | 1,100 | 2 | 1,350 | 2 | 35.5 | 5.22 | 10.2 | 85.9 | 800 | −50 |
| 11 | 1,150 | 1.5 | 1,260 | 1 | 11.0 | 3.55 | 5.8 | 89.6 | 1,330 | −18 |
| 12 | 1,050 | 1 | 1,280 | 1.5 | 15.3 | 3.78 | 7.6 | 90.2 | 1,360 | −21 |
| 13* | 1,050 | 2 | 1,350 | 1 | 32.1 | 4.83 | 9.5 | 86.1 | 920 | −48 |
| 14 | 1,150 | 2 | 1,280 | 2 | 17.6 | 3.79 | 7.5 | 91.0 | 1,390 | −19 |
| 15 | 1,200 | 2 | 1,280 | 3 | 18.5 | 3.99 | 7.7 | 90.6 | 1,360 | −20 |
| 16* | 1,050 | 2 | 1,200 | 3 | 2.7 | 1.02 | 1.2 | 89.5 | 1,500 | −15 |
| 17* | 1,150 | 5 | 1,260 | 2 | 31.5 | 4.44 | 8.8 | 84.0 | 920 | −5 |
| 18 | 1,200 | 3 | 1,280 | 1 | 18.2 | 3.96 | 7.7 | 89.9 | 1,330 | −24 |
| 19 | 1,100 | 2 | 1,220 | 2 | 4.1 | 2.26 | 4.8 | 89.2 | 1,440 | −18 |
| 20* | 1,100 | 0.5 | 1,260 | 2 | 2.4 | 1.22 | 1.3 | 89.4 | 1,430 | −21 |

*SAMPLE FOR COMPARATIVE EXAMPLE

TABLE 2-2

| SAMPLE NOS. | CALCINATING TEMP. (° C.) | CALCINATING TIME (hr) | CALCINING TEMP (° C.) | CALCINING TIME (hr) | ASPECT RATIO | SURFACE ROUGHNESS ($\mu$m) | TENSILE STRENGTH (kg/cm$^2$) | RELATIVE DIELECTRIC CONSTANT ($\epsilon r$) | Q | $\tau \epsilon r$ |
|---|---|---|---|---|---|---|---|---|---|---|
| 21 | 1,050 | 4 | 1,260 | 1.5 | 11.0 | 2.88 | 5.3 | 92.3 | 1,210 | −15 |
| 22 | 1,050 | 2 | 1,260 | 2 | 10.5 | 2.66 | 5.5 | 89.7 | 1,440 | −20 |
| 23 | 1,100 | 1.5 | 1,220 | 4 | 4.4 | 2.36 | 4.5 | 89.1 | 1,440 | −19 |
| 24 | 1,050 | 1 | 1,220 | 4 | 3.5 | 2.00 | 4.0 | 90.1 | 1,400 | −20 |
| 25 | 1,050 | 2 | 1,300 | 2 | 22.1 | 3.66 | 8.1 | 91.1 | 1,350 | −18 |
| 26 | 1,200 | 2 | 1,260 | 2 | 12.4 | 3.22 | 6.6 | 89.9 | 1,400 | −26 |
| 27 | 1,050 | 1 | 1,260 | 2 | 10.6 | 2.38 | 5.5 | 89.9 | 1,400 | −24 |
| 28 | 1,200 | 2 | 1,260 | 2 | 13.1 | 3.28 | 6.7 | 89.6 | 1,410 | −23 |
| 29 | 1,100 | 3.5 | 1,260 | 1.5 | 10.9 | 2.88 | 5.8 | 90.1 | 1,260 | −13 |
| 30 | 1,150 | 2 | 1,260 | 2 | 12.1 | 3.21 | 5.6 | 89.8 | 1,350 | −22 |

TABLE 2-2-continued

| SAMPLE NOS. | CALCINATING TEMP. (° C.) | CALCINATING TIME (hr) | CALCINING TEMP (° C.) | CALCINING TIME (hr) | ASPECT RATIO | SURFACE ROUGHNESS ($\mu$m) | TENSILE STRENGTH (kg/cm$^2$) | RELATIVE DIELECTRIC CONSTANT ($\epsilon$r) | Q | $\tau \epsilon r$ |
|---|---|---|---|---|---|---|---|---|---|---|
| 31 | 1,050 | 2 | 1,280 | 2 | 13.3 | 3.15 | 7.3 | 89.9 | 1,350 | −28 |
| 32 | 1,050 | 2 | 1,260 | 2 | 11.4 | 2.65 | 5.1 | 89.8 | 1,440 | −24 |
| 33* | 1,050 | 3 | 1,300 | 6 | 33.3 | 4.32 | 8.9 | 80.5 | 880 | −55 |
| 34* | 1,050 | 2 | 1,240 | 0.5 | 1.8 | 1.11 | 1.2 | 82.2 | 950 | −4 |
| 35 | 1,100 | 2 | 1,300 | 2 | 25.5 | 4.23 | 8.2 | 92.4 | 1,300 | −18 |
| 36 | 1,050 | 3 | 1,220 | 1.5 | 3.7 | 2.11 | 4.6 | 89.2 | 1,250 | −26 |
| 37 | 1,100 | 1.5 | 1,260 | 2 | 10.3 | 2.44 | 5.6 | 89.6 | 1,330 | −25 |
| 38* | 1,020 | 3 | 1,300 | 2 | 1.5 | 1.01 | 0.9 | 92.5 | 1,560 | −16 |
| 39 | 1,100 | 2 | 1,280 | 2.5 | 15.1 | 3.01 | 6.0 | 89.6 | 1,410 | −22 |
| 40* | 1,250 | 2 | 1,280 | 2 | 36.7 | 5.25 | 9.0 | 79.8 | 830 | −2 |

*SAMPLE FOR COMPARATIVE EXAMPLE

It is found from the results as indicated in Tables 2-1 and 2-2 above that Samples Nos. 1-9, 11, 12, 14-15, 18-19, 21-32, 35-37 and 39, which are encompassed within the scope of the present invention, demonstrate the characteristics as shown by the relative dielectric constant $\epsilon$r of 89 or higher, the Q factor of 1,200 or higher, the temperature coefficient V $\epsilon$r (ppm/° C.) of the relative dielectric constant of ±30 ppm/° C. or smaller, and the adherence strength of the electrode of 4 kg or higher.

On the other hand, it is found from the results of Tables 2-1 and 2-2 above that Samples Nos. 16, 20, 34 and 38, which are outside the scope of the present invention, become too flat on the surface and cannot provide a sufficient degree of the anchor effects, thereby making the the adherence strength of the electrode as lower as smaller than 4 kg, when the aspect ratio of the precipitated particles becomes smaller than 3.

Further, it is found that for Samples Nos. 10, 13, 17, 33 and 40, which are outside the scope of the present invention, the packing among the particles is broken and the electrical features, such as the relative dielectric constant $\epsilon$r, the Q factor, the temperature coefficient $\tau \epsilon$r of the relative dielectric constant, are worsened.

In the above examples, the ceramic material in the disk form was used for measurement for its characteristics in order to readily make a comparison of the characteristics of the dielectric ceramic.

In another embodiment of the present invention, a sample in a cylinder form was prepared as shown in FIG. 3 by forming an electrode 22 on the surface of a cylinder-shaped dielectric ceramic material 21 into a TEM mode coaxial resonator which in turn was measured for electrical features. Further, the resonator was soldered on a board 23 in order to measure the peeling strength of the electrode when the force was applied in the rolling direction. As a result, it was found that the resonator achieved substantially the same results as the other samples as described above did.

When a dielectric filter is to be formed using the such resonator, the coaxial resonator is required to be installed directly on a board with a pattern formed thereon. When the ceramic material according to the present invention is used at this end, it can provide the dielectric filter having the dielectric ceramic and the electrode attached to each other at a higher strength and having a high degree of reliability.

It should be noted herein that the present invention is not interpreted as being limited to the examples and the embodiments as described hereinabove and the present invention encompasses any modifications and variations within the scope of the present invention, which do not depart from the spirit of the invention.

It can be noted that, for example, the carbonate, hydroxide or oxalate may also be used as raw material, in place of the oxide, and that they can achieve substantially the same results as the oxide can.

It is also found that substantially the same results can be obtained by setting the aspect ratio of the particles precipitated only on the surface of the ceramic material, on which the electrode is formed, for example, with an additive capable of controlling the particle growth located thereon by the coating method. It is further found that substantially the same results can be obtained by procedures other than the coating method or by locating such additive after calcination and then thermally treating the calcined material.

Moreover, the ceramic material according to the present invention can be used as a dielectric resonator of a form other than the TEM mode coaxial resonator or as a dielectric antenna board.

EFFECTS OF THE INVENTION

The present invention can improve an adherence strength between the ceramic material and the electrode without adding a minute component in an electrode paste or subjecting the surface of the ceramic material to any chemical treatment because rod-shaped particles are precipitated projecting from the surface of the ceramic material so as to demonstrate an aspect ratio of about 3 to 30. The present invention can achieve the effects accordingly that a ceramic electronic part with a high degree of reliability and without worsening characteristics at high frequency can be provided.

What is claimed is:

1. A ceramic electronic part comprising a ceramic material and an electrode formed on a surface of the ceramic material wherein ceramic rod-shaped particles project from a surface of the ceramic material on the side of the electrode, wherein said rod-shaped particles are of a same general composition as the ceramic material and have an aspect ratio (a long axis to short axis ratio) of 3 to 30.

2. The ceramic electronic part as claimed in claim 1, wherein said ceramic material comprises a dielectric ceramic composition which contains, as a major component, a composite oxide comprising: an oxide of barium (Ba), an oxide of titanium (Ti); an oxide of at least one rare earth element; and one or both of an oxide of bismuth (Bi) and an oxide of lead (Pb).

3. The ceramic electronic part as claimed in claim 2, wherein said composite oxide comprises: barium (Ba) at a rate of from 16 to 16.5 mol %, when translated into BaO; titanium (Ti) at a rate of from 65.7 to 66.9 mol %, when translated into $TiO_2$; the at least one rare earth element at a rate of from 14.4 to 16 mol %, when translated into an oxide of the at least one rare earth element: and one or both of bismuth (Bi) at a rate of from 2 to 2.5 mol %, when translated into $Bi_2O_3$, and lead (Pb) at a rate of from 2 to 2.5 mol %, when translated into $Pb_3O_4$.

* * * * *